March 24, 1964
L. T. HOLDEN
3,126,191
MOUNTING DEVICES
Filed Jan. 19, 1960
4 Sheets-Sheet 1
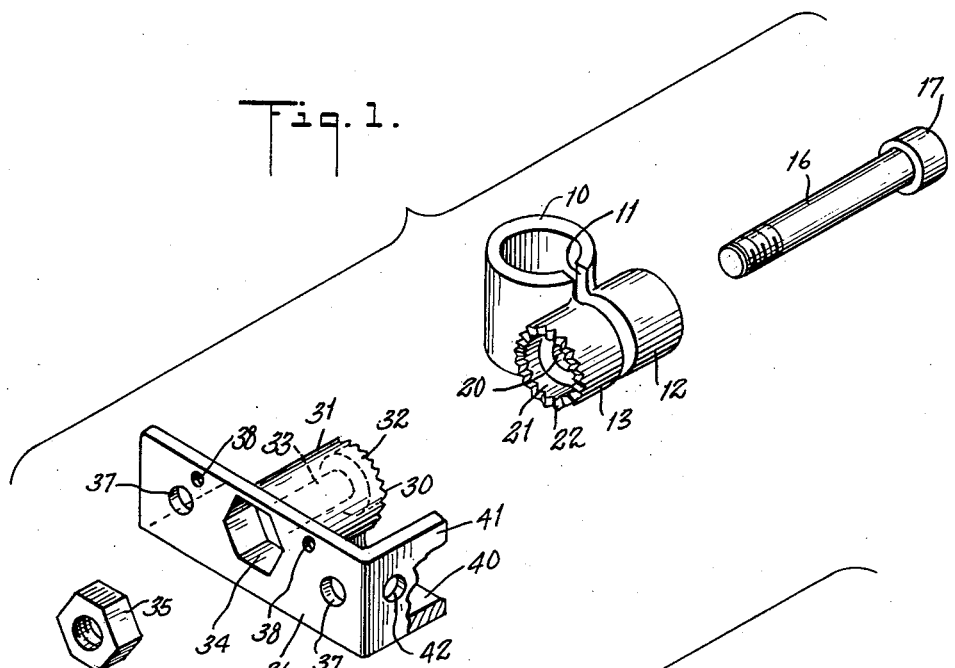
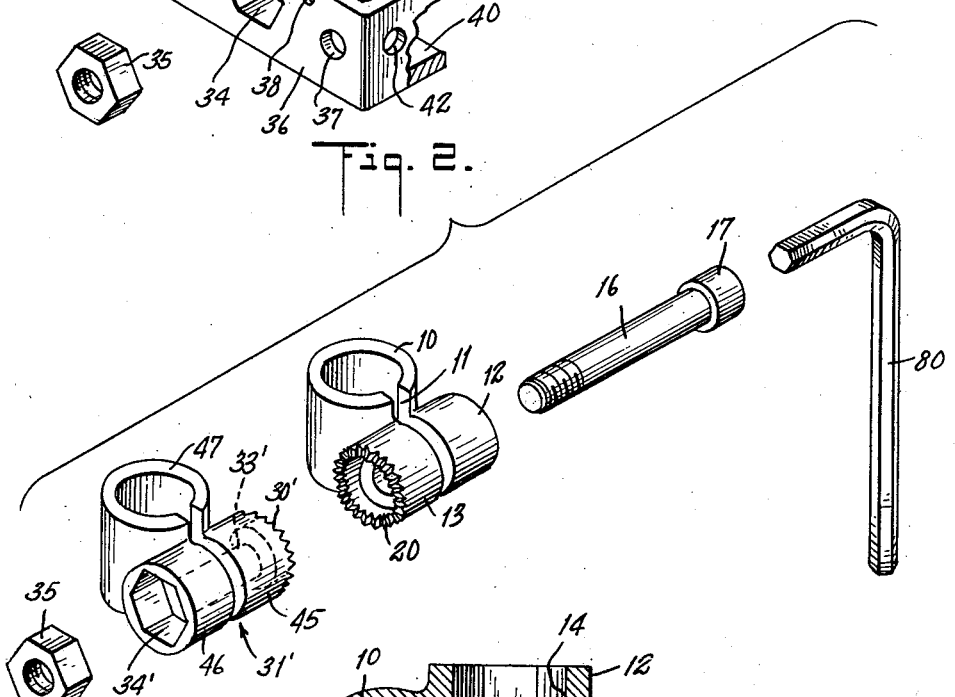
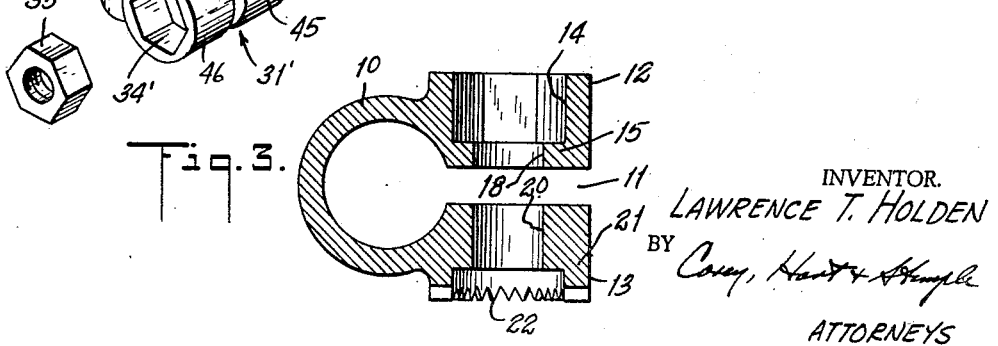
INVENTOR.
LAWRENCE T. HOLDEN
BY
ATTORNEYS

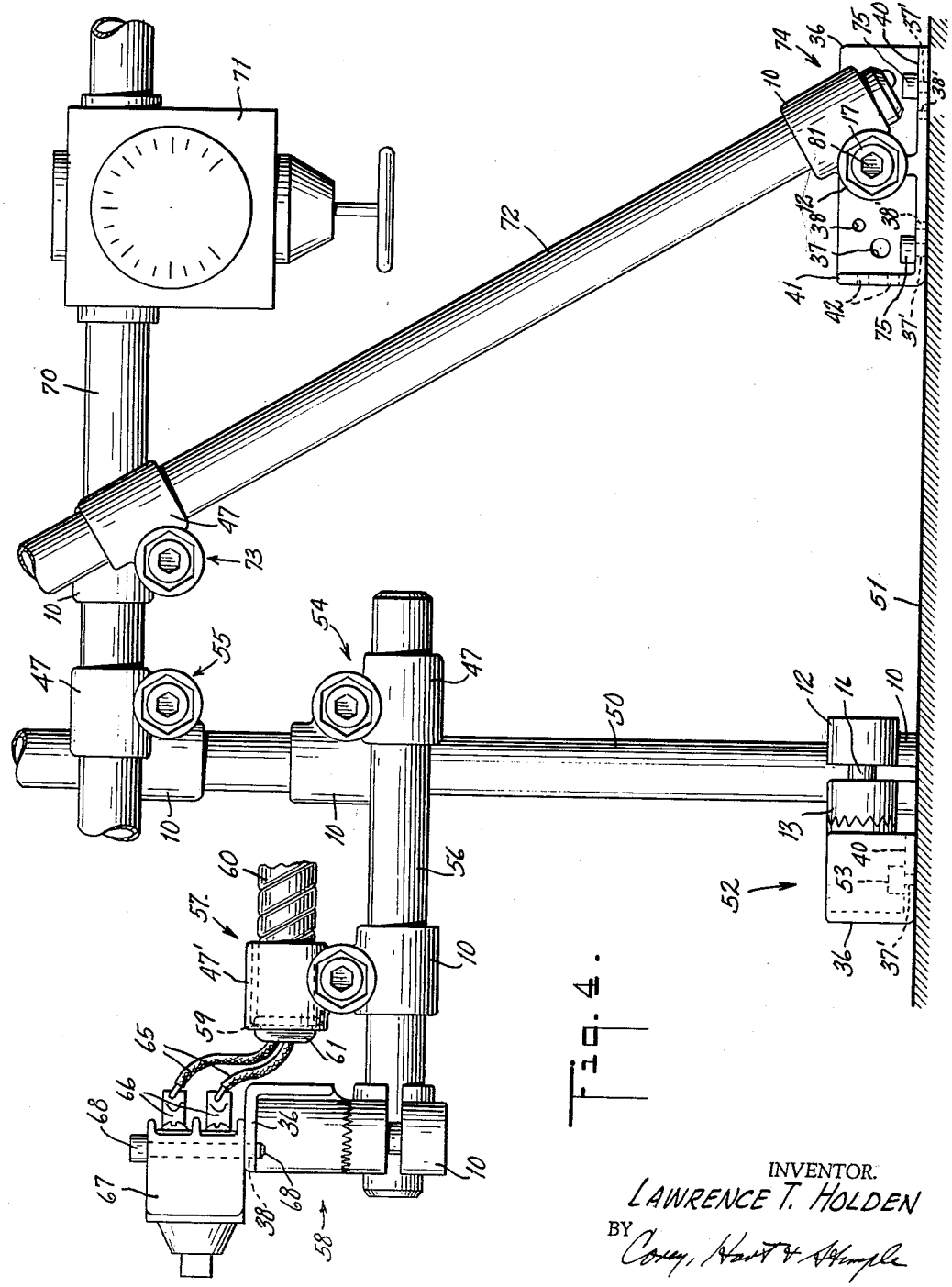

March 24, 1964
L. T. HOLDEN
3,126,191
MOUNTING DEVICES
Filed Jan. 19, 1960
4 Sheets-Sheet 3
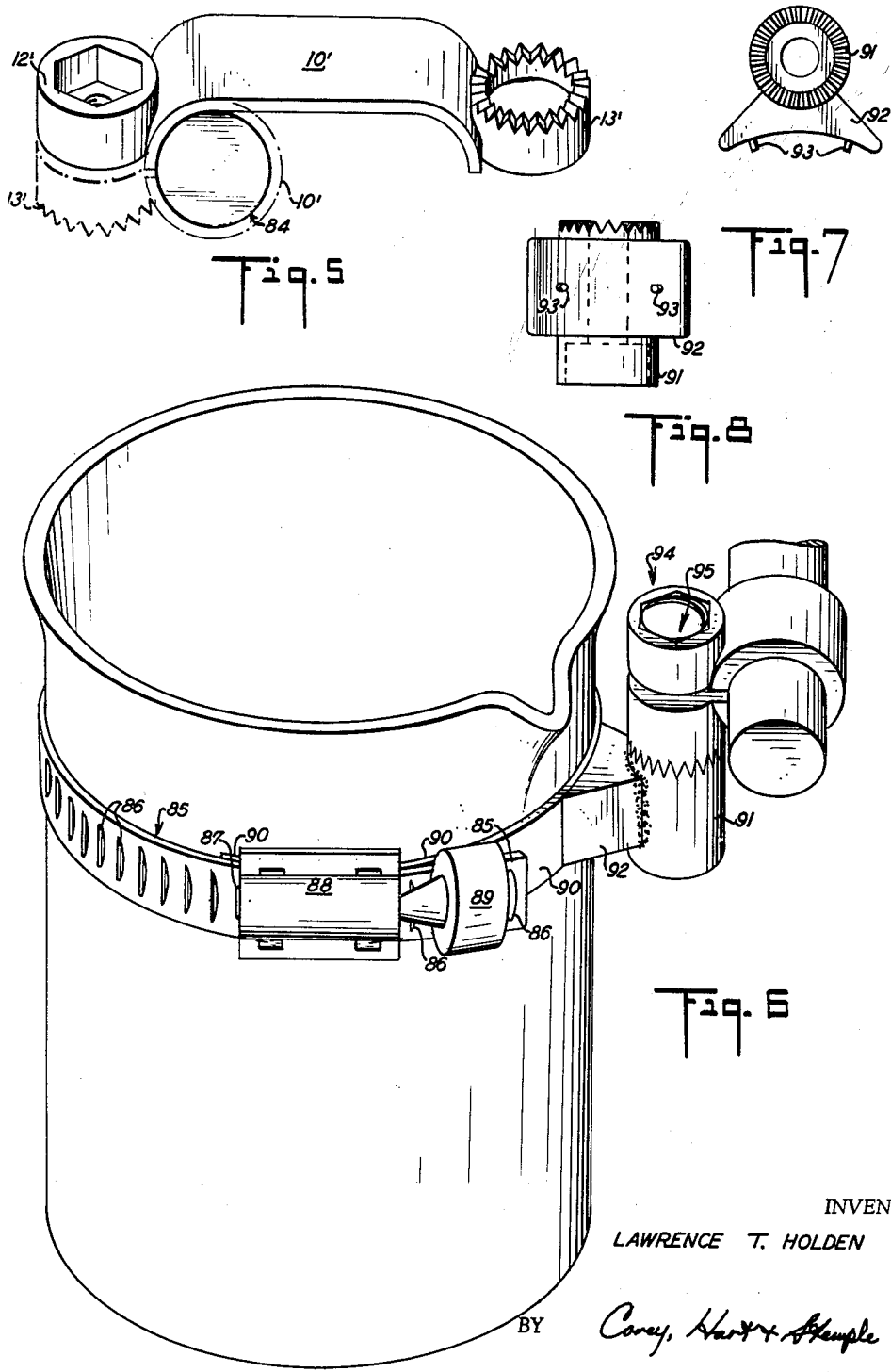
INVENTOR
LAWRENCE T. HOLDEN
BY *Corey, Hart & Stemple*
ATTORNEY March 24, 1964 L. T. HOLDEN 3,126,191
MOUNTING DEVICES Filed Jan. 19, 1960 4 Sheets-Sheet 4

INVENTOR
LAWRENCE T. HOLDEN

BY Corey Hart & Semple

ATTORNEY

United States Patent Office 3,126,191
Patented Mar. 24, 1964

3,126,191
MOUNTING DEVICES
Lawrence T. Holden, Southern Blvd., Chatham, N.J.
Filed Jan. 19, 1960, Ser. No. 3,460
12 Claims. (Cl. 248—286)

This invention relates to mounting devices, and more particularly to an improved device capable of mounting a member or another device in any one of a number of different positions on a support.

This application is a continuation-in-part of my application Serial No. 774,445, filed November 17, 1958, now abandoned.

The primary purpose of the invention is to provide a mounting device of such universalness that it may be employed as a mounting for a great variety of things or utilized in the building of the many types of apparatus having bars, tubes or pipes incorporated in their structures. Illustrative of the possible uses of the device are as mountings for electrical devices such as switches, electrical cables and solenoids; as mountings for mechanical devices such as jack shafts, cylinders, and for various types of chemical and hydraulic apparatus. The device of the invention can also be used to equal advantage in the construction of various types of equipment such as furniture, towers, grills, shelving, etc. The device of the invention is especially advantageous in the construction of light weight or small scale structures of the indicated types.

Another object of the invention is to provide an improved device of the indicated type which may be utilized to join supporting bars and to support elements and devices at any angle relative to a support.

A further object of the invention is to provide an improved device of the indicated type which can be readily and quickly assembled for its intended purpose with the use of a simple, inexpensive tool.

A still further object of the invention is to provide an improved device of the indicated type which is simple and rugged in construction and which can readily be manufactured economically in large quantities.

Other objects of the invention, as well as the advantages and novel details of construction thereof, will become apparent from a perusal of the following description when read in connection with the accompanying drawings in which:

FIG. 1 is an exploded view showing in perspective the parts which constitute a device of the invention constructed for use as a support for another device;

FIG. 2 is a similar view showing the construction of the device when it is to be utilized for connecting bars in an apparatus and illustrating the type of tool which may be employed in assembling such apparatus;

FIG. 3 is a longitudinal sectional view on an enlarged scale of the junction unit of the device shown in FIG. 1;

FIG. 4 is an elevational view of apparatus illustrating a number of uses for the device of the invention;

FIG. 5 is a perspective view of a modified form of one of the parts of the device;

FIG. 6 is a perspective view of another embodiment of the invention and showing the method of using such embodiment to support a container on a bar;

FIG. 7 is a top plan view of one of the parts of the embodiment of FIG. 6;

FIG. 8 is a front elevational view of the part shown in FIG. 7;

Figure 9:
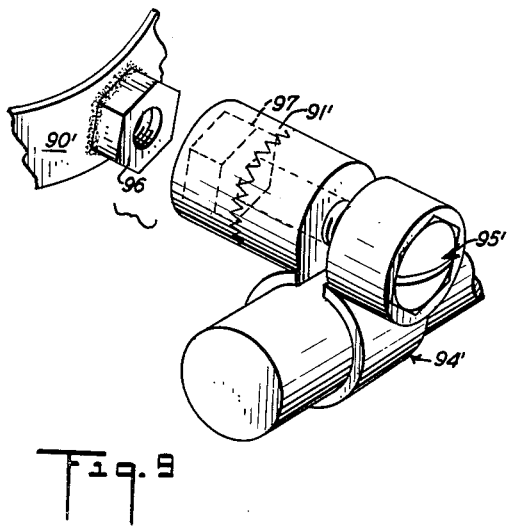
FIG. 9 is an exploded perspective view showing a modification of the embodiment of FIG. 6.
Figure 10:
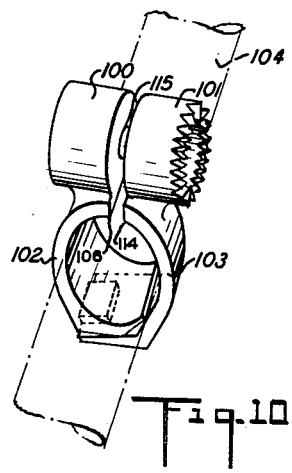
FIG. 10 is a perspective view of another form of one of the parts of the device.

It will be noted from the drawings, that the device of this invention, whether constructed for use essentially as a support, or constructed for use essentially as a building unit, is constituted of three parts, namely, a junction unit to be secured to a supporting object or to be supported by such object; a support unit which interlocks with the junction unit to enable the former to accomplish its supporting functions, and a fastening unit to maintain said junction and support units in interlocked relation. It will become apparent from the disclosure that in the uses of the device of the invention the structures of the junction and support units are interchangeable. Thus, the junction unit of the device of FIG. 1 of the drawings may be employed as a support unit and the support unit in such device may be employed as a junction unit. Accordingly, where a unit, whether used as a junction unit or as a support unit in the devices illustrated is of similar construction, such unit and the portions thereof have been given the same reference numerals. The fastening unit is of the same construction in all the figures and accordingly is designated by the same reference characters throughout the drawings.

Referring now to FIG. 1 of the drawings which shows the device of the invention constructed primarily for use in connection with plane surfaces, it will be observed that the junction unit thereof is composed of a clamp portion 10 which may be cylindrically-shaped, as shown, and having a longitudinal split 11 of sufficient width to enable it to obtain a secure grip on a bar or cable when the ends of such portion are moved towards each other. For example, in a portion 10 having an inside diameter of ½″ and a wall thickness of approximately ³⁄₃₂″, the normal width of the slit 11 may be ⅛″. The length of such a portion may be ¾″ in order to provide sufficient bearing surface to enable the portion 10 to maintain a firm grip on the bar under relatively heavy stresses. In the construction shown the portion 10 may be made of an integral piece of any suitable material having sufficient inherent resilience to enable such portion to flex without fracture when attached to or removed from a bar. It will be understood, however, that the portion 10 may be composed of a plurality of hinged pieces.

Integrally connected to the ends of the clamp portion 10 is a connector element bisected into two portions 12 and 13 having a common longitudinal central axis disposed at right angles to the central axis of the clamp portion 10. It will be observed from a comparison of the several units shown in the drawings having a similar clamp portion, that the portions 10 thereof have a length substantially greater than the outside diameters of the aligned connector portions 12 and 13, which diameters are substantially the same, and that the aligned portions 12 and 13 are offset on the ends of portion 10 so that they are substantially spaced from the top edge of portion 10, as viewed in FIG. 1, and so that a plane containing the bottom edge of portion 10, as so viewed, is substantially tangent to the exterior surfaces of the portions 12 and 13. This characteristic of the unit's construction can be observed more clearly in the units shown in FIG. 4 of the drawings. The portions 12 and 13 are normally spaced longitudinally from each other by the normal width of the slit 11. The inner slit end of connector portion 12 is provided with an internal flange 15 having a central opening 18 of sufficient size to enable the shank 16 of the bolt which constitutes the fastening unit of the device, to be readily inserted therethrough. The opening 18 is a reduced inner end portion of the bore through connector portion 12, the larger main portion of such bore being defined by the interior wall 14 thereof. The interior wall 14 of portion 12 and the flange 15 form a seat for the head 17 of the bolt or for a nut. The inner wall 14 may have a configuration similar to the configuration of the bolt head 17 or the nut and in the drawings is shown as hexagonal to conform to the shape of the bolt nut 35. The inner wall 14 preferably has a longitudinal dimension approximately equal to the length of the bolt head so that the latter may be substantially contained within the connector portion 12.

The bore 20 of the connector portion 13 has a diameter substantially similar to the diameter of the flange opening 18 and also slidably receives the bolt shank 16. At its outer end the bore 20 is enlarged to provide an annularly shaped rim 21 which encircles in spaced relation the shank 16 of a bolt extending through such connector portion 13. The outer face of the rim 21 is cut to provide an annular set of longitudinally extending teeth 22. The teeth 22 may be of any suitable size and shape, but it is preferred to provide on the rim 21 thirty-six equally spaced teeth of a depth of approximately $\frac{1}{16}''$. The set of teeth 22 may be circumferentially displaced 5° (½ tooth) so that the vertical plane passed through the longitudinal axis of the connector portion 13 and parallel to the longitudinal axis of clamp portion 10 will pass through the middle of the space between the two adjacent teeth directly above and below such axis.

The set of teeth 22 on connector portion 13 interlock with a set of teeth 30 on a cooperating connector element 31. The set of teeth 30 are generally similar in construction to the set of teeth 22 and may or may not be circumferentially displaced 5° with respect to the set of teeth 22. Thus, it is possible to interlock teeth 22 and 30 to fix the longitudinal axis of clamp portion 10 of the junction unit at either right angles or parallel to the supporting surface of the support unit and to vary the position of such supporting surface to one in which it is disposed at an angle from a given plane, such as the vertical plane, equal to the unit angle resulting from the number of teeth in such sets of teeth (10° in the construction illustrated) or a multiple of such unit angle, or at an angle from the given vertical plane midway of such unit angle or multiples thereof. Thus, in the construction illustrated, if either the set of teeth 22 or the set of teeth 30 is displaced 5° (½ tooth) from the vertical and the other set is not so displaced, it will be possible to position the supporting surface of the support unit at either right angles or parallel to the longitudinal axis of clamp portion 10 and such supporting surface may be rotated from such positions to positions which are displaced at an angle of 10° or at an angle which is a multiple of 10° from such positions. Instead of displacing only one of the sets of teeth 22 and 30 to enable the establishment of either said right angular or parallel relationship of the units, it is preferred that both sets of teeth 22 and 30 be displaced 2½° from the vertical to avoid the necessity for stocking both offset and non-offset units. Such an angular circumferential displacement in an annular set of 36 equally spaced teeth would correspond to a displacement of one-quarter tooth. It is to be noted that if the sets of teeth 22 and 30 are both either displaced or not displaced from the vertical, the supporting surface may be rotated from the vertical to a position in which it is displaced at an angle of 5° from the vertical or at an angle which is a multiple of 5° from the vertical.

The set of teeth 30 are cut out on an end rim 32 having a construction similar to rim 21 and being formed by an enlargement of the associated end of the bore 33 through connector element 31. The bore 33 has a diameter substantially similar to the diameter of the bore 20 and slidably receives the bolt shank 16. The other end of bore 33 is enlarged and configured to provide a nut-shaped seat 34 for the nut 35 to be screwed on the threads 36 provided on the bolt shank 16. As shown, the seat 34 is preferably deep enough to receive entirely either the nut 35 or the bolt head 17 to keep clear the supporting surface of the associated plate 36. It will be evident that as a result of the construction of bore 33 and connector portion 12, the bolt need have a length only as long as approximately the combined lengths of connector portions 12 and 13 and bore 33. It will be evident also that when the bolt is assembled on the connector portions 12 and 13 and connector element 31 and tightened, the teeth 22 and 30 will be securely interlocked and together with the nut 35 will maintain connector element 31 in a predetermined position relative to the connector portion 13 and consequently clamp portion 10 of the junction unit. The tightened bolt will also reduce the width of slit 11 and thereby cause the clamp portion 10 to securely grip the bar on which it is mounted. The length of element 31 may be substantially similar to the combined length of connector portions 12 and 13 and the width of slit 11, thus permitting a bolt of standard length for all assembly combinations, some of which are illustrated in FIG. 4 of the drawings.

The support unit shown in FIG. 1 of the drawings and of which connector element 31 forms an integral part, includes a supporting element comprising a plate 36 integral with the outer end of element 31 in which is formed the seat 34. The plate 36 is disposed at right angles to the longitudinal axis of connector element 31 and is elongated in form having a width substantially equal to the outside diameter of element 31 plus the thickness of such plate and equal to the length of clamp portion 10, and having a length approximately three times such outside diameter. The thickness of plate 36 is substantially equal to the distance that the aligned portions 12 and 13 are spaced from the top edge of portion 10, as viewed in FIG. 1, to enable such top edge to be positioned flush with the supporting surface of plate 36 when such portion 10 is reversed from the position shown in FIG. 1 and such top edge is in engagement with a unit supporting surface 51 as is illustrated by the device designated 52 in FIG. 4. In such arrangement the bottom edge of portion 10, as viewed in FIG. 1, is positioned substantially flush with the top edge of plate 36, as viewed in the illustration of the unit designated 52 in FIG. 4 of the drawings. The seat 34 is substantially centrally located in plate 36 so that the ends of the latter are substantially equidistant from such seat. On each side of the seat 34 the plate 36 is provided with an opening 37 through which a screw or bolt may be inserted to secure the plate to a supporting surface, and intermediate such opening 37 and the seat 34, with an internally threaded opening 38 to receive a threaded bolt for securing a device to such plate. The supporting member of the cooperating element further includes an elongated plate 40 which is disposed at right angles to plate 36 and which is integrally connected along one side edge to a side edge of plate 36 and along its transverse central portion to connector element 31. The plate 40 has a length, width and thickness substantially similar to the length, width and thickness, respectively, of plate 36. The plate 40 is further provided with openings 37′ and threaded openings 38′ similar to openings 37 and 38, respectively, and arranged on such plate in a fashion similar to the arrangement of openings 37 and 38, respectively, on plate 36 (note FIG. 4 of the drawings). At one end, the plates 36 and 40 are integrally connected along their end edges to the adjoining side edges of a square-shaped plate 41. Plate 41 has a thickness similar to the thickness of plates 36 and 40 and may be provided with a plurality of openings 42 (note FIGS. 1 and 4) through which screws or bolts may be inserted to secure the supporting member at its end to a supporting surface.

The support unit forming part of the assemblage shown in FIG. 2 of the drawings includes a connector element 31′ which is comparable to the connector element 31 shown in FIG. 1, and principally differing from the latter in that it is divided into two parts 45 and 46 at a point substantially midway of its length. Like element 31, element 31' is provided with a bore 33' which extends throughout its length through both parts 45 and 46, which is provided at its inner end, on the part 45 thereof, with an annular set of teeth 30', and which is provided at its outer end, on the part 46 thereof, with a nut-shaped seat 34' for the bolt nut 35 or the bolt head 17. The support unit in FIG. 2 of the drawings further differs from the support unit of FIG. 1 in that the support element thereof consists of a cylindrically-shaped clamp portion 47 which is similar in construction to the clamp portion 10 in the junction unit. The parts 45 and 46 are connected to the ends of the clamp portion 47 in a manner substantially similar to the manner in which connector portions 12 and 13 are connected to the clamp portion 10, part 45 being similar to portion 13 and part 46 being similar to portion 12. Thus, when the parts are assembled and the bolt tightened the resulting longitudinal contraction of the parts 45 and 46 will cause the portion 47 to become securely fastened to the bar to which this junction unit is directly connected.

Referring now to FIG. 4 of the drawings which illustrates the manner of use of the two above described embodiments of the invention, the reference numeral 50 designates generally a standard which is supported in vertical position on a surface 51 by a device generally designated 52 and similar in construction to the device illustrated in FIG. 1 of the drawings. In this use of the device, the portion 10 of the junction unit is positioned with its projecting end resting against the surface 51 so that one end edge thereof coacts with the supporting surface of plate 40 to lend additional rigidity to the structure. Thus in this use of the junction unit, its position is reversed from that shown in FIG. 1. The support unit of the device is used substantially as shown in FIG. 1 with the plate 40 thereof secured to the surface 51 by screws 53 extending through the openings 37' in such plate and secured in the material of surface 51.

Mounted on the standard 50 are two devices each similar in construction to the device illustrated in FIG. 2 of the drawings and designated generally by the numerals 54 and 55. The clamp portions 10 in both of these devices are secured to the standard 50 in a similar manner. The connector elements 31' of these devices have been moved through an angle of 90° from the position shown in FIG. 2 before interlocking the associated sets of teeth 22 and 30' so that the clamp portions 47 are disposed at right angles to the associated clamp portions 10. In the device 54, the connector element 31' has been moved counterclockwise from the position shown in FIG. 2 to bring the portion 47 under such element 31'. In the device 55, on the other hand, the element 31' has been moved in the opposite direction or clockwise, to bring the clamp portion 47 into an overlying position.

Securely gripped by the clamp portion 47 of device 54 is one end of a bar 56 which carries intermediate its ends a device 57 substantially similar to the device of FIG. 2 and which supports as its other end a device 58 similar to the device of FIG. 1. The clamp portion 47' of device 57 has been moved through an angle of 180° from the position shown in FIG. 2 prior to the locking of such portion relative to the clamp portion 10 of such device. The portion 47' differs from the portion 47 of FIG. 2 in the respect that it is additionally provided at one end with an inturned flange 59 to convert it into a seat for the end of the cable 60 secured therein. The inturned flange 59 further functions as a support for a grommet 61 made of insulating material such as rubber or plastic, and provided with an annular recess in which is located the flange 69. The grommet 61 provides an insulating seal for the end of cable 60 and forms a protective buffer and support for the cable wires 65 which extend out through a central opening thereof. The ends of the wires 65 are connected to the terminals 66 of a switch 67 mounted on the plate 36 of the support unit of device 58. The switch 67 is of usual construction and is secured to plate 36 by the aid of bolts 68 which are usually provided for the attachment of switches of the type illustrated and which threadedly engage with the openings 38 in such plate. It will thus be seen that the device 58 securely supports the switch 67 in a predetermined precise position on the bar 56 and that the device 57 fixes the end of the cable in predetermined relation to such switch so that there is no strain on the wires connected to the switch and any possibility of damage thereto or to the connection thereof to the switch during usage is substantially eliminated.

The clamp portion 47 of the device 55 on standard 50 is secured to and supports a horizontally disposed pipe 70 to which may be connected a number of components forming part of a particular apparatus, such as the pneumatic component 71 shown in FIG. 4. The pipe 70 may be additionally supported by a brace bar 72 which is connected to pipe 70 by a device 73 similar to the device of FIG. 2 and which is secured to surface 51 by a device 74 similar to the device of FIG. 1. The device 74 is anchored to surface 51 by screws or bolts 75 which pass through the openings 37' in plate 40 of the supporting member thereof. The devices 73 and 74 illustrate other angular arrangements that may be made with the junction and support units thereof and thereby further demonstrate the flexibility of such devices. The angle of brace bar 72 may be arrived at by adjustment in 10° steps of the units shown in FIG. 4. If the teeth of an associated pair of connector elements are offset relative to each other by 5°, the adjustment angles will be arrived at by 10° steps from the vertical. On the other hand, steps midway of the aforesaid steps may be arrived at by the use of connector elements whose teeth are not displaced by 5° with respect to each other.

It is believed evident from the showing of FIG. 4 of the drawings and the foregoing discussion that the previously described embodiments of this invention have great versatility and the capability of being employed in a large number of situations and in a variety of arrangements. It is also evident that the construction of such embodiments is of such simple nature that it may be readily assembly in a desired manner through the manipulation of a fastening unit which is constituted of a single locking member, i.e., the bolt, and with the aid of a simple tool such as a coin, or the bolt wrench or key 80 shown in FIG. 2 of the drawings and engageable in suitable key holes 81 provided in the ends of the bolt heads 17 (note the device 74 in FIG. 4).

The embodiment of the invention shown in FIG. 5 of the drawings is a modification of the junction unit shown in FIG. 1 of the drawings and like the latter includes a clamp portion 10', and connector portions 12' and 13'. The connector portions 12' and 13' are substantially similar in construction to the connector portions 12 and 13, respectively, of FIG. 1 and are used in a similar manner in the device of this invention. The clamp portion 10' of FIG. 5 differs from portion 10 in FIG. 1 in the respect that it is made of material sufficiently flexible and pliable to enable it to assume the form shown in full lines in FIG. 5 and to enable it to be readily wrapped around a supporting rod 84 into clamping relation therewith as is indicated in dotted lines in such figure. The clamp portion 10' therefore is in the nature of a strap having sufficient flexibility to enable it to be wrapped around rods and the like. The material of clamp portion 10' may also have sufficient inherent resiliency so that when such portion is released from its clamping condition (the dotted line condition shown in FIG. 5), it will automatically return to the condition shown in full lines in such figure. Materials that may be employed in the construction of the clamp portion 10' to give it the qualities desired, are suitable molded plastic materials, or punch-pressed steel of a thickness of about 0.020". The connector portions 12' and 13' may be made of the same material as clamp portion 10' or of different materials that are considered more suitable for the purposes of use of the device.

FIGS. 6 to 9 illustrate how the support unit of the device may be provided with a different type of support element than the plate 36 formed on the support unit 31 shown in FIG. 1 of the drawings and the clamp portion 47 formed on the support unit 31' shown in FIG. 2 of the drawings. In the constructions shown in FIGS. 6 to 9, the support element is constituted of a well known type of hose clamp construction composed of a metallic strap provided on one end portion 85 with a series of transverse apertures 86 adapted to receive the thread of a worm 87 rotatably mounted in a casing 88 secured to the other end portion 90 of the strap. The worm 87 has secured to its inner end a finger piece 89 which may be manually rotated to turn the worm 87 in one direction or the other. It will be understood that in this type of clamp a plurality of convolutions of the worm 87 will engage with a similar number of successive apertures 86 in that part of the strap end portion 85 which extends through the casing 88 between the worm 87 and the other end portion 90 of the strap. Thus, when the finger piece 89 is rotated in one direction, the worm 87 and consequently the casing 88 and the other end portion 90 of the strap, will advance on the apertured end portion 85 of the strap to reduce the circumference of the strap and thereby tighten it on the object. When the finger piece 89 is manually rotated in the other direction, the area defined by the strap will be enlarged.

Attached to the other end portion 90 of the strap are means whereby the connector element of the support unit of the device may be permanently or detachably connected to the strap. In the construction shown in FIGS. 6 to 8, the connector element 91 is permanently connected to the strap portion 90 by a bracket element 92. The element 92 has a generally triangular configuration and is concavely-shaped at its ends. The smaller concavely-shaped end of the element 92 provides a cradle support for the connector element 91, the two being permanently secured together in any suitable fashion, as by solder. The larger concavely-shaped end of the element 92 is provided with two integral pins 93 which extend through suitable openings in the strap end portion 90 and are permanently secured to such strap end portion in any suitable manner, as by riveting. The connector element 91 is otherwise substantially similar in construction to the connector element 31 shown in FIG. 1 of the drawings and is associated with a junction unit and a fastening unit which are designated generally in FIG. 6 of the drawings by the numerals 94 and 95, respectively, and which are similar in construction to the junction unit 10, 12 and 13 and fastening unit 16, 17 and 35 shown in FIG. 1 of the drawings.

In the construction shown in FIG. 9 of the drawings, the connector element 91', junction unit 94' and fastening unit 95' are constructed substantially similarly to the connector element 91, junction unit 94 and fastening unit 95, respectively, shown in FIG. 6. However, instead of being permanently connected to the other end portion 90' of the clamp strap through a bracket element, as is connector element 91 by the bracket element 92, connector element 91' is detachably connected to such end portion through a nut 96 which is fixed to such end portion in any suitable manner, as by welding. Nut 96 is received within the nut-shaped seat 97 and is threadedly engaged with the bolt shank of the fastening unit 95' when the parts are assembled. The nut 96 therefore serves a double purpose in the construction shown in FIG. 9. It cooperates with the bolt element of the fastening unit to attach the junction unit 94' and the connector element 91' securely to the strap end portion 90' and secondly forms part of the fastening unit 95' of the device.

Figure 11:
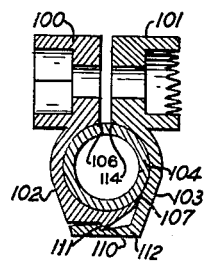
FIG. 11 is a vertical sectional view of the part shown in FIG. 10.
Figure 12:
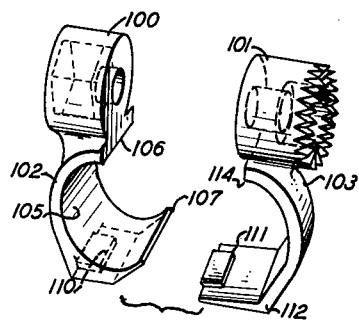
FIG. 12 is a view substantially similar to FIG. 10 but showing the two portions forming such part separated.
Figure 13:
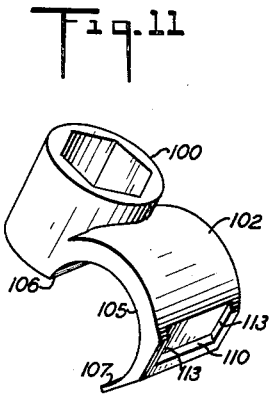
FIG. 13 is another perspective view of one of the portions shown in FIG. 12.

It is also within the contemplation of the invention to have the support element of either the junction unit or the support unit made in the form of a two part clamp which may be assembled on the supporting object. A preferred form of such a clamp portion embodied in the junction unit of the device is shown in FIGS. 10 to 13 of the drawings. The connector portions 100 and 101 of the unit shown in these figures are similar in construction to the connector portions 12 and 13, respectively, of FIG. 1 and cooperate with the support and fastener units of the device in a manner similar to that described with respect to such portions 12 and 13. The clamp portion of the unit shown in these figures is comparable to the clamp portion 10 of FIG. 1 and when assembled functions in a manner substantially similar to the latter. The clamp portion associated with connector portions 100, 101, however, is composed of two parts, one part 102 of which is integral with connector portion 100 and the other part 103 which is integral with connector portion 101. The clamp parts 102, 103 are constructed to embrace a circular object such as the annularly-shaped rod 104 shown in FIGS. 10 and 11. Clamp part 102 has an inner wall 105 which in longitudinal section, as shown in FIG. 11, has the configuration of an arc whose radius is substantially the same as the external radius of the rod 104 so that such inner wall 105 snugly embraces the exterior surface of rod 104. The inner wall 105 has a straight side edge 106 adjacent to the connector portion 100 and extending in parallelism with the central axis of the clamp portion defined by the clamp parts 102 and 103. The other, or outer free side edge 107 extends in parallelism with inner edge 106. The length in degrees of the arc of wall 105 between the edges 106, 107 thereof is slightly greater than 180°, approximately 190°, so that the straight line distance between edges 106, 107 is slightly less than the length of the external diameter of the annular rod 104. It is necessary therefore, in order to mount the clamp part 102 on the rod 104 to force it over the surface of such rod, the material of the clamp part having sufficient inherent resiliency to enable the edge portions 106, 107 to spread under the applied force to permit the clamp part to receive the rod and then to retract to permit the entire inner wall 105 to snugly engage the rod. This method of mounting clamp part 102 on the rod 104 takes place with a snap action and the part will remain in the position in which it has been applied to such rod until it is positively removed therefrom with a substantial force.

The clamp part 102 has formed in its exterior surface near its free edge 107, a transverse shoulder 110 adapted to be engaged by a transverse catch member 111 provided on the end 112 of clamp part 103. Guide walls 113 are formed at the ends of the shoulder 110 to facilitate the engagement of the catch member 111 with such shoulder and to maintain the clamp parts in proper alignment in use when so assembled. The exterior surface of clamp part 102 between shoulder 110 and the free edge 107 thereof is beveled to permit the inner surface of clamp part 103 to come into snug engagement with the exterior surface of the rod. The portion of the inner surface of clamp part 103 beyond the free edge 107 of clamp part 102, when such clamp parts are assembled on the rod 104, and to the inner edge 114 thereof is arcuately shaped to conform to the curvature of the exterior surface of rod 104. It will thus be understood that after the clamp part 102 has been snapped onto the rod 104, the clamp part 103 is hinged thereto by engaging the catch member 111 of the latter with the abutment or shoulder on 110 and permitted to seat on the rod 104. Because of the configurations of the interengaged catch member and shoulder and the guide walls 113, the openings in the connector portions 100, 101, will come into alignment as the clamp part 103 seats on the rod to permit the ready insertion therethrough of the bolt 115 in FIG. 10 of the fastening unit.

As has been indicated, the clamp part 102, after it has been snapped in position on rod 104, will remain in such position until positively displaced therefrom without the necessity of the user holding the same. The user can therefore direct his entire efforts to assembling the clamp part 103 on the clamp part 102 and the rod 104.

While I have hereinabove described and illustrated in the drawings preferred constructions of my device and several methods in which the same may be utilized, it will be evident to those skilled in the art, that changes and modifications may be made therein without departing from the spirit of the invention or the scope of the appended claims.

I claim:

1. A mounting device comprising a junction unit, a support unit, and a fastening unit comprising a bolt, said junction unit and said support unit each comprising a support element having a configuration enabling it to removably connect the unit of which it forms a part to another object, and each comprising a tubularly-shaped connector element fixedly connected to said support element thereof and having a bolt receiving bore extending therethrough, said connector element of each of said junction and support units having at one end thereof a rim which encircles said bolt extending through such bore and which has formed thereon a plurality of longitudinally extending identical locking members of substantial length engaging in interlocking relation with the plurality of locking members on the other connector element to lock said engaged connector elements and therefore said junction and support units in given fixed relation until said locking members are longitudinally disengaged, the support element of at least one of said junction and support units including means to enclosed an object and for forming on such object a tubularly-shaped, longitudinally split clamp portion, and the other support element including a plate having an object supporting surface and being provided with means to enable another object to be secured to said supporting surface, the connector element of said one unit having said split clamp portion bisected to form a pair of aligned tubularly-shaped portions having a common longitudinal axis disposed at right angles to the longitudinal axis of said clamp portion, said connector element portions being connected to the split edges of said clamp portion and said connector portion on which said locking elements are provided having an axial length greater than one half the cross-sectional dimension of said clamp portion in the direction of the axis of such connector portion, said aligned connector element portions having substantially similar outside diameters and the longitudinal dimension of said clamp portion being substantially greater than the length of one of said diameters, said connector element portions being integrally connected to the split edges of said clamp portion and spaced from one end edge of said clamp portion, and the combined length of one of said diameters and width of the space between said connector element portions and said one end edge being equal to the width of said plate in said other support element so that said one end edge of the clamp portion may be placed flush with a side edge of said plate to enable said junction and support elements through such edges to cooperate with a supporting surface in the support of an object, and said fastening unit comprising a bolt extended through both said connector elements and the latter being relatively movable angularly on said bolt, said bolt having a part engaged with one of said connector elements and having a part engageable with the other of said connector elements, and one of said bolt parts being adjustable to cause said bolt simultaneously to lock the locking members of said connector elements together in interlocked relation, thereby fixing the position of one of such connector elements relative to the other, and to reduce the width of the split in said clamp portion, thereby causing said clamp portion to securely grip a bar on which it may be mounted, whereby said bolt constituting said fastening unit both locks said junction and support units together and secures such latter units to the bar.

2. A mounting device such as defined in claim 1, in which a plane containing the other end edge of said clamp portion is substantially tangent to the exterior surfaces of said aligned connector element portions so that when such other end edge is placed against a supporting surface said connector element portions coact therewith to rigidify the position on said supporting surface of the unit of which said clamp portion forms a part.

3. A mounting device for connecting together two separate objects in supported, given angular relation and constituted of three parts, a junction unit for securing the device to one of such objects, a support unit for connecting the device to the other of such objects and adjustably interlockable with said junction unit to lock the two objects together in the given angular relation, and a fastening unit to maintain said junction and support units in interlocked relation, said junction unit and said support unit each comprising a support element having a configuration enabling it to removably connect the unit of which it forms a part to one of the objects, and each comprising a tubularly shaped connector element fixedly connected to said support element thereof and having a bolt receiving bore extending therethrough, said connector elements of said junction and support units being coaxially aligned with the opposed inner ends thereof in abutting relation, and each of such abutting inner connector element ends being provided with a plurality of longitudinally extending identical locking members of substantial length engaging in interlocking relation with the plurality of locking members on the abutting end of the other connector element to lock said engaged connector elements and therefore said junction and support units precisely in a given angular relation until said locking members are longitudinally disengaged, the support element of at least one of said junction and support units including means to enclose an object and for forming on such object a tubularly-shaped, longitudinally split clamp portion, the connector element of said one unit having said split clamp portion being bisected to form a pair of aligned tubularly-shaped portions having a common longitudinal axis disposed at right angles to the longitudinal axis of said clamp portion, said connector element portions being connected to the split edges of said clamp portion, and said connector portion on which said locking elements are provided having an axial length greater than one half the cross-sectional dimension of said clamp portion in the direction of the axis of such connector element portion, and said fastening unit comprising a bolt extending through both said connector elements and the latter being relatively movable angularly on said bolt to provide complete 360° adjustability of said connector elements relative to each other, said bolt having a part engaged with the outer end of one of said connector elements and having a part engageable with the outer end of the other of said connector elements, and one of the bolt parts being adjustable to cause said bolt simultaneously to lock the locking members of said connector elements together in interlocked relation to fix the adjusted angular position of one of such connector elements relative to the other, and to reduce the width of the split in said clamp portion to cause said clamp portion to securely grip an object on which it is mounted, whereby said bolt constituting said fastening unit both locks said junction and support units together and secures such latter units to the object and thereby secures both objects together in precise angular relation.

4. A mounting device such as defined in claim 3, in which the locking members on each of said connector elements are composed of a set of teeth and in which the set of teeth on at least one of said connector elements is circumferentially displaced through a predetermined angle with respect to a given datum line at right angles to the longitudinal axis of said connector elements to establish a given possible range of angular relationship between the objects to which said locking members are connected.

5. A mounting device for a combination to connect together two separate objects in supported, given angular relation and constituted of three parts, a junction unit for securing the device to one of such objects, a support unit for connecting the device to the other of such objects and adjustably interlockable with said junction unit to lock the two objects together in the given angular relation, and a fastening unit to maintain said junction and support units in interlocked relation, said mounting device constituting the associated junction unit or the associated support unit in said combination and comprising a support element having a configuration enabling it to removably connect the device to one of the objects, and a tubularly-shaped connector element fixedly connected to said support element thereof and having a bolt receiving bore extending therethrough, said connector element being coaxially alignable with the connector element of the associated unit and with one end constituting the inner end thereof in abutting relation with the inner end of such connector element of the associated unit, the bore in said one inner end of the connector element of said mounting device being enlarged to form at said one end, a longitudinally outwardly projecting annular rim of a thickness substantially less than the thickness of the wall of said connector element adjacent to said rim and which encircles in spaced relation a bolt extending through the bore of said connector element, said rim having formed thereon a plurality of outwardly projecting, longitudinally extending, identical locking members of substantial length to engage in interlocking relation with the plurality of locking members provided on the abutting end of the connector element of the associated unit to lock such engaged connector elements and therefore said support element precisely in a given angular relation until such locking members are longitudinally disengaged, and said connector element of said mounting device having an axial length greater than one half the dimension of said support element of said mounting device in the direction of the axis of said connector element, the bore in the other outer end of the connector element of said mounting device being also enlarged to form a recessed seat for a part of said fastening unit.

6. A mounting device such as defined in claim 5, in which said support element comprises a plate provided with means to enable such other object to be secured to a surface thereof, the dimension of said plate in the direction of the axis of said connector element being less than the axial length of said connector element.

7. A mounting device such as defined in claim 5, in which said tubularly-shaped connector element has a given outside diameter and is located between two edges of said support element spaced apart a distance greater than the length of said diameter, said connector element being substantially tangent to a plane containing one of said edges of the support element and being spaced a given distance from a parallel plane containing the other of said support element edges.

8. A mounting device such as defined in claim 5, in which the locking members on said connector element are in the form of teeth and said teeth are circumferentially displaced a given portion of a tooth with respect to a given datum line at right angles to the axis of said connector element to establish a given range of angular relationship between said connector element and the connector element of the associated unit.

9. A mounting device such as defined in claim 8, in which said teeth are circumferentially displaced one quarter of a tooth with respect to said given datum line.

10. A mounting device for connecting together two separate objects in supported, given angular relation and constituted of three parts, a junction unit for securing the device to one of such objects, a support unit for connecting the device to the other of such objects and adjustably interlockable with said junction unit to lock the two objects together in the given angular relation, and a fastening unit to maintain said junction and support units in interlocked relation, said junction unit and said support unit each comprising a support element having a configuration enabling it to removably connect the unit of which it forms a part to one of the objects, and each comprising a tubularly-shaped connector element fixedly connected to said support element thereof and having a bolt receiving bore extending therethrough, said connector elements of said junction and support units being coaxially aligned with the opposed inner ends thereof in abutting relation, and each of such abutting inner connector element ends being provided with a plurality of longitudinally extending identical locking members of substantial length engaging in interlocking relation with the plurality of locking members on the abutting end of the other connector element to lock said engaged connector elements and therefore said junction and support units precisely in a given angular relation until said locking members are longitudinally disengaged, the support element of at least one of said junction and support units including means to enclose an object and for forming on such object a tubularly-shaped, longitudinally split clamp portion, the connector element of said one unit having said split clamp portion being bisected to form a pair of aligned tubularly-shaped portions having a common longitudinal axis disposed at right angles to the longitudinal axis of said clamp portion, said connector element portions being connected to the split edges of said clamp portion, and said connector portion on which said locking elements are provided having an axial length greater than one half the cross-sectional dimension of said clamp portion in the direction of the axis of such connector element portion, the support element of the other of said junction and suppport units including a plate having an object supporting surface and being provided with means to enable another object to be fixedly secured to said supporting surface so that the two objects are locked together in given angular relation through said interlocked connector elements, and said fastening unit comprising a bolt extending through both said connector elements and the latter being relatively movable angularly on said bolt to provide complete 360° adjustability of said connector elements relative to each other, said bolt having a part engaged with the outer end of one of said connector elements and having a part engageable with the outer end of the other of said connector elements, and one of the bolt parts being adjustable to cause said bolt simultaneously to lock the locking members of said connector elements together in interlocked relation to fix the adjusted angular position of one of such connector elements relative to the other, and to reduce the width of the split in said clamp portion to cause said clamp portion to securely grip an object on which it is mounted, whereby said bolt constituting said fastening unit both locks said junction and support units together and secures such latter units to the object and thereby secures both objects together in precise angular relation.

11. A mounting device for connecting together two separate objects in supported, given angular relation and constituted of three parts, a junction unit for securing the device to one of such objects, a support unit for connecting the device to the other of such objects and adjustably interlockable with said junction unit to lock the two objects together in the given angular relation, and a fastening unit to maintain said junction and support units in interlocked relation, said junction unit and said support unit each comprising a support element having a configuration enabling it to removably connect the unit of which it forms a part to one of the objects, and each comprising a tubularly-shaped connector element fixedly connected to said support element thereof and having a bolt receiving bore extending therethrough, said connector elements of said junction and support units being coaxially aligned with the opposed inner ends thereof in abutting relation, and each of such abutting inner connector element ends being provided with a plurality of longitudinally extending identical locking members of substantial length engaging in interlocking relation with the plurality of locking members on the abutting end of the other connector element to lock said engaged connector elements and therefore said junction and support units precisely in a given angular relation until said locking members are longitudinally disengaged, the support element of at least one of said junction and support units including means to enclose an object and for forming on such object a tubularly-shaped, longitudinally split clamp portion, the connector element of said one unit having said split clamp portion being bisected to form a pair of aligned tubularly-shaped portions having a common longitudinal axis disposed at right angles to the longitudinal axis of said clamp portion, said connector element portions being connected to the split edges of said clamp portion, and said connector portion on which said locking elements are provided having an axial length greater than one half the cross-sectional dimension of said clamp portion in the direction of the axis of such connector element portion, the other support element of such juncture and support units including a plurality of plates integrally connected to the connector element associated with such other support element, each of said plates being angularly disposed relative to the others and being provided with means to enable another object to be secured to the support surface thereof, and said fastening unit comprising a bolt extending through both said connector elements and the latter being relatively movable angularly on said bolt to provide complete 360° adjustability of said connector elements relative to each other, said bolt having a part engaged with the outer end of one of said connector elements and having a part engageable with the outer end of the other of said connector elements, and one of the bolt parts being adjustable to cause said bolt simultaneously to lock the locking members of said connector elements together in interlocked relation to fix the adjusted angular position of one of such connector elements relative to the other, and to reduce the width of the split in said clamp portion to cause said clamp portion to securely grip an object on which it is mounted, whereby said bolt constituting said fastening unit both locks said junction and support units together and secures such latter units to the object and thereby secures both objects together in precise angular relation.

12. A mounting device for a combination to connect together two separate objects in supported, given angular relation and constituted of three parts, a junction unit for securing the device to one of such objects, a support unit for connecting the device to the other of such objects and adjustably interlockable with said junction unit to lock the two objects together in the given angular relation, and a fastening unit to maintain said junction and support units in interlocked relation, said mounting device constituting the associated junction unit or the associated support unit in said combination and comprising a support element having a configuration enabling it to removably connect the device to one of the objects, and a tubularly-shaped connector element fixedly connected to said support element thereof and having a bolt receiving bore extending therethrough, said support element comprising a pair of plates connected to said connector element and to each other, both of said plates being transversely disposed to the longitudinal axis of said connector element and being angularly disposed to the other, and at least one of said plates having a supporting surface extending in the direction of said longitudinal axis and of a dimension in such direction less than the axial length of said connector element, said connector element being coaxially alignable with the connector element of the associated unit and with one end constituting the inner end thereof in abutting relation with the inner end of such connector element of the associated unit, the bore in said one inner end of the connector element of said mounting device being enlarged to form at said one end, a longitudinally outwardly projecting annular rim of a thickness substantially less than the thickness of the wall of said connector element adjacent to said rim and which encircles in spaced relation a bolt extending through the bore of said connector element, said rim having formed thereon a plurality of outwardly projecting, longitudinally extending, identical locking members of substantial length to engage in interlocking relation with the plurality of locking members provided on the abutting end of the connector element of the associated unit to lock such engaged connector elements and therefore said support element precisely in a given angular relation until such locking members are longitudinally disengaged, and said connector element of said mounting device having an axial length greater than one half the dimension of said support element of said mounting device in the direction of the axis of said connector element, the bore in the other outer end of the connector element of said mounting device being also enlarged to form a recessed seat for a part of said fastening unit.

References Cited in the file of this patent

UNITED STATES PATENTS

| 519,312 | Arthur | May 8, 1894 |
| 1,217,960 | Klorer | Mar. 7, 1917 |
| 1,320,820 | Aird | Nov. 4, 1919 |
| 1,375,888 | Baer | Apr. 26, 1921 |
| 1,667,604 | Peters | Apr. 24, 1928 |
| 1,680,560 | McDonald | Aug. 17, 1928 |
| 1,793,911 | Dann | Feb. 24, 1931 |
| 1,858,564 | See | May 17, 1932 |
| 2,021,082 | North | Nov. 12, 1935 |
| 2,059,605 | Powell | Nov. 3, 1936 |
| 2,066,699 | Skelton | Jan. 5, 1937 |
| 2,219,940 | Ritz-Woller | Oct. 29, 1940 |
| 2,334,706 | Ingalls | Nov. 23, 1943 |
| 2,431,100 | Woods | Nov. 18, 1947 |
| 2,454,707 | Meyers | Nov. 23, 1948 |
| 2,466,717 | Littell | Apr. 12, 1949 |
| 3,012,746 | Pfaff | Dec. 12, 1961 |

FOREIGN PATENTS

| 514,959 | Canada | July 26, 1955 |
| 589,327 | France | Feb. 19, 1925 |
| 840,828 | France | Jan. 23, 1939 |

OTHER REFERENCES

Heating, Piping & Air Conditioning, September 1956, page 312, "Jiffy Clips."